US012574868B2

(12) United States Patent
Khoshnevisan et al.

(10) Patent No.: US 12,574,868 B2
(45) Date of Patent: Mar. 10, 2026

(54) TRANSMIT POWER CONTROL CONFIGURATION FOR PHYSICAL UPLINK CONTROL CHANNEL REPETITION ACROSS MULTIPLE COMPONENT CARRIERS

(71) Applicant: QUALCOMM Incorporated, San Diego, CA (US)

(72) Inventors: Mostafa Khoshnevisan, San Diego, CA (US); Yi Huang, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 536 days.

(21) Appl. No.: 17/817,566

(22) Filed: Aug. 4, 2022

(65) Prior Publication Data

US 2023/0039103 A1 Feb. 9, 2023

Related U.S. Application Data

(60) Provisional application No. 63/203,986, filed on Aug. 5, 2021.

(51) Int. Cl.
*H04W 52/54* (2009.01)
*H04L 5/00* (2006.01)
(Continued)

(52) U.S. Cl.
CPC ............. *H04W 52/54* (2013.01); *H04L 5/001* (2013.01); *H04W 52/08* (2013.01);
(Continued)

(58) Field of Classification Search
CPC ........... H04W 72/0446; H04W 72/232; H04W 72/20; H04W 52/38; H04W 88/06;
(Continued)

(56) References Cited

U.S. PATENT DOCUMENTS

| | | | |
|---|---|---|---|
| 2011/0250918 A1 | 10/2011 | Jen | |
| 2023/0247632 A1* | 8/2023 | Gou ....................... H04L 1/1896 | |
| | | | 370/329 |
| 2024/0007962 A1* | 1/2024 | Babaei .................. H04W 52/48 | |

FOREIGN PATENT DOCUMENTS

CN 112514305 A * 3/2021 ............ H04W 72/20

OTHER PUBLICATIONS

CATT: "Remaining Issues on PUCCH on SCell for Rel-13 CA", 3GPP TSG RAN WG1 Meeting #81, R1-152564, 3rd Generation Partnership Project, Mobile Competence Centre, 650, Route Des Lucioles, F-06921 Sophia-Antipolis Cedex, France, vol. RAN WG1, No. Fukuoka, Japan, May 25, 2015-May 29, 2015, May 24, 2015, XP050971631, 2 Pages, Section 2.2.
(Continued)

*Primary Examiner* — Tu X Nguyen
(74) *Attorney, Agent, or Firm* — Harrity & Harrity, LLP

(57) ABSTRACT

Various aspects of the present disclosure generally relate to wireless communication. In some aspects, a user equipment (UE) may receive downlink control information (DCI) scheduling transmission of a first one or more physical uplink control channel (PUCCH) communications on a first component carrier and a second one or more PUCCH communications on a second component carrier, wherein the DCI includes information identifying a first transmit power configuration for the first one or more PUCCH communications and a second transmit power configuration for the second one or more PUCCH communications. The UE may transmit the first one or more PUCCH communications in accordance with the first transmit power configuration and the second one or more PUCCH communications in accordance with the second transmit power configuration. Numerous other aspects are described.

30 Claims, 10 Drawing Sheets

(51) Int. Cl.
| | |
|---|---|
| *H04W 52/08* | (2009.01) |
| *H04W 52/14* | (2009.01) |
| *H04W 52/32* | (2009.01) |
| *H04W 72/23* | (2023.01) |

(52) U.S. Cl.
CPC ....... *H04W 52/146* (2013.01); *H04W 52/325* (2013.01); *H04W 72/23* (2023.01)

(58) Field of Classification Search
CPC ... H04W 72/231; H04W 52/48; H04W 52/08; H04W 52/146; H04W 52/34; H04W 74/0833; H04W 76/27; H04W 52/32; H04W 52/18; H04W 52/04; H04W 74/0836; H04W 74/0838; H04W 52/58
See application file for complete search history.

(56) References Cited

OTHER PUBLICATIONS

International Search Report and Written Opinion—PCT/US2022/074620—ISA/EPO—Nov. 18, 2022.
Mediatek Inc: "On UE Feedback Enhancements for HARQ-ACK", 3G PP TSG RAN WG 1 Meeting #1 04b-e, R1-2102694, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 2021, 17 Pages, XP052177699, Sections 2, 2.1, 2.2 and 4.2.

\* cited by examiner

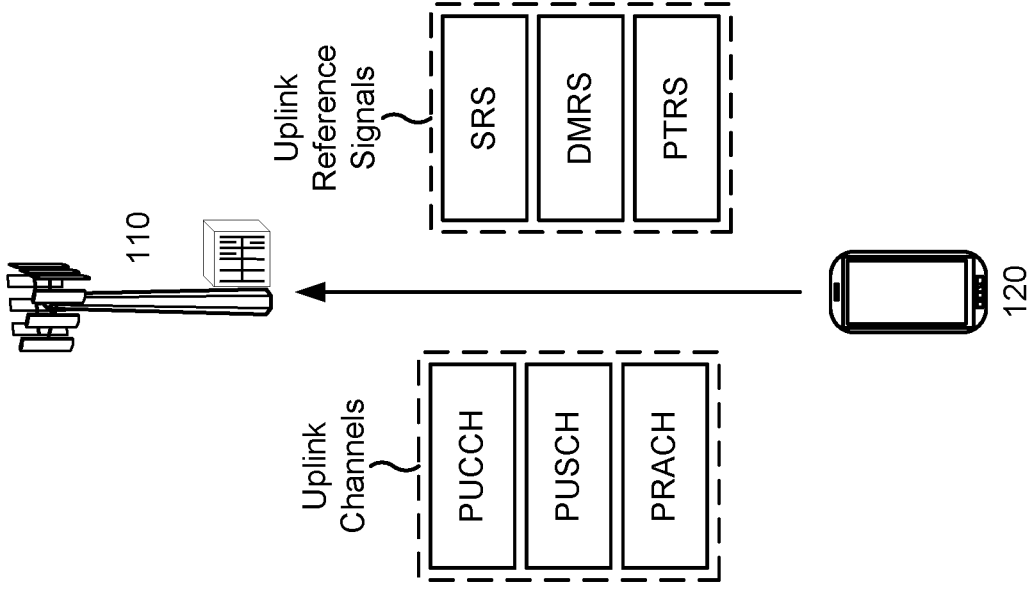
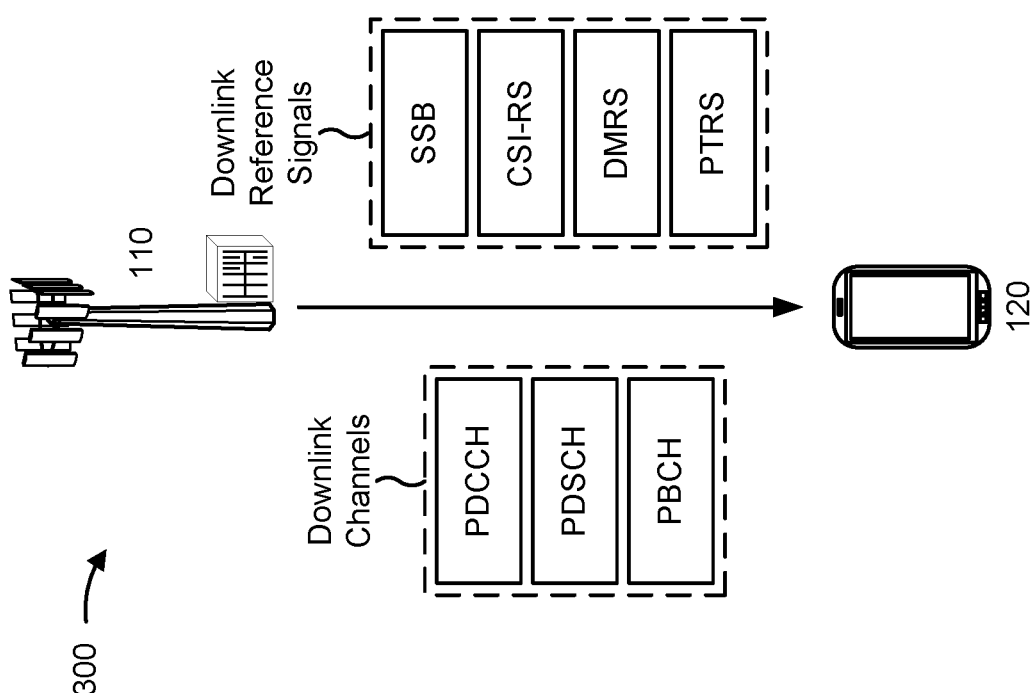
FIG. 3

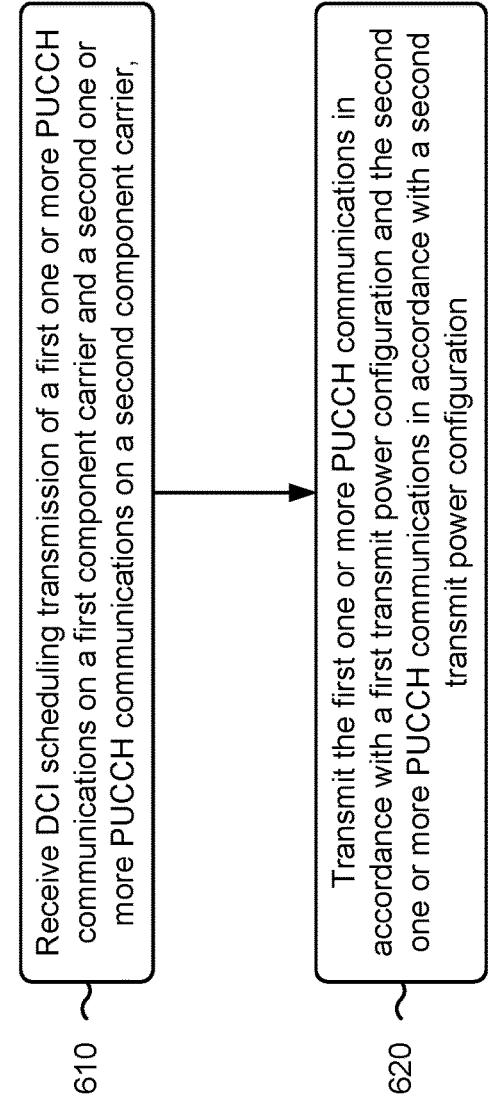

600

610 Receive DCI scheduling transmission of a first one or more PUCCH communications on a first component carrier and a second one or more PUCCH communications on a second component carrier, 620 Transmit the first one or more PUCCH communications in accordance with a first transmit power configuration and the second one or more PUCCH communications in accordance with a second transmit power configuration

FIG. 6

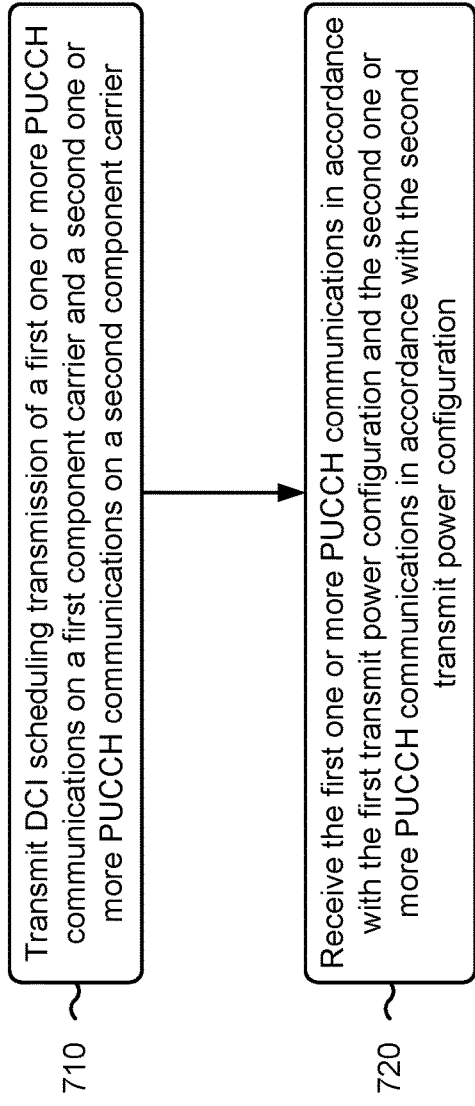

700

710 — Transmit DCI scheduling transmission of a first one or more PUCCH communications on a first component carrier and a second one or more PUCCH communications on a second component carrier 720 — Receive the first one or more PUCCH communications in accordance with the first transmit power configuration and the second one or more PUCCH communications in accordance with the second transmit power configuration

FIG. 7

TRANSMIT POWER CONTROL CONFIGURATION FOR PHYSICAL UPLINK CONTROL CHANNEL REPETITION ACROSS MULTIPLE COMPONENT CARRIERS

CROSS-REFERENCE TO RELATED APPLICATION

This Patent Application claims priority to U.S. Provisional Patent Application No. 63/203,986, filed on Aug. 5, 2021, entitled "TRANSMIT POWER CONTROL CONFIGURATION FOR PHYSICAL UPLINK CONTROL CHANNEL REPETITION ACROSS MULTIPLE COMPONENT CARRIERS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for transmit power control (TPC) configuration for physical uplink control channel repetition across multiple component carriers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include memory, one or more processors coupled to the memory, and instructions stored in the memory and executable by the one or more processors. The instructions may be executable by the one or more processors to cause the user equipment to receive downlink control information (DCI) scheduling transmission of a first one or more physical uplink control channel (PUCCH) communications on a first component carrier and a second one or more PUCCH communications on a second component carrier, wherein the DCI includes information identifying a first transmit power configuration for the first one or more PUCCH communications and a second transmit power configuration for the second one or more PUCCH communications. The instructions may be executable by the one or more processors to cause the user equipment to transmit the first one or more PUCCH communications in accordance with the first transmit power configuration and the second one or more PUCCH communications in accordance with the second transmit power configuration.

Some aspects described herein relate to a method of wireless communication performed by a UE. The method may include receiving DCI scheduling transmission of a first one or more PUCCH communications on a first component carrier and a second one or more PUCCH communications on a second component carrier, wherein the DCI includes information identifying a first transmit power configuration for the first one or more PUCCH communications and a second transmit power configuration for the second one or more PUCCH communications. The method may include transmitting the first one or more PUCCH communications in accordance with the first transmit power configuration and the second one or more PUCCH communications in accordance with the second transmit power configuration.

Some aspects described herein relate to a non-transitory computer-readable medium that stores one or more instructions for wireless communication by a UE. The one or more instructions, when executed by one or more processors of the UE, may cause the UE to receive DCI scheduling transmission of a first one or more PUCCH communications on a first component carrier and a second one or more PUCCH communications on a second component carrier, wherein the DCI includes information identifying a first transmit power configuration for the first one or more PUCCH communications and a second transmit power configuration for the second one or more PUCCH communications. The one or more instructions, when executed by one or more processors of the UE, may cause the UE to transmit the first one or more PUCCH communications in accordance with the first transmit power configuration and the second one or more PUCCH communications in accordance with the second transmit power configuration.

Some aspects described herein relate to an apparatus for wireless communication. The apparatus may include means for receiving DCI scheduling transmission of a first one or more PUCCH communications on a first component carrier and a second one or more PUCCH communications on a second component carrier, wherein the DCI includes information identifying a first transmit power configuration for the first one or more PUCCH communications and a second transmit power configuration for the second one or more PUCCH communications. The apparatus may include means for transmitting the first one or more PUCCH communications in accordance with the first transmit power configuration and the second one or more PUCCH communications in accordance with the second transmit power configuration.

Some aspects described herein relate to a network node for wireless communication. The network node may include memory, one or more processors coupled to the memory, and instructions stored in the memory and executable by the one or more processors. The instructions may be executable by the one or more processors to cause the network node to transmit DCI scheduling transmission of a first one or more PUCCH communications on a first component carrier and a second one or more PUCCH communications on a second component carrier, wherein the DCI includes information identifying a first transmit power configuration for the first one or more PUCCH communications and a second transmit power configuration for the second one or more PUCCH communications. The instructions may be executable by the one or more processors to cause the network node to receive the first one or more PUCCH communications in accordance with the first transmit power configuration and the second one or more PUCCH communications in accordance with the second transmit power configuration.

Some aspects described herein relate to a method of wireless communication performed by a network node. The method may include transmitting DCI scheduling transmission of a first one or more PUCCH communications on a first component carrier and a second one or more PUCCH communications on a second component carrier, wherein the DCI includes information identifying a first transmit power configuration for the first one or more PUCCH communications and a second transmit power configuration for the second one or more PUCCH communications. The method may include receiving the first one or more PUCCH communications in accordance with the first transmit power configuration and the second one or more PUCCH communications in accordance with the second transmit power configuration.

Some aspects described herein relate to a non-transitory computer-readable medium that stores one or more instructions for wireless communication by a network node. The one or more instructions, when executed by one or more processors of the network node, may cause the network node to transmit DCI scheduling transmission of a first one or more PUCCH communications on a first component carrier and a second one or more PUCCH communications on a second component carrier, wherein the DCI includes information identifying a first transmit power configuration for the first one or more PUCCH communications and a second transmit power configuration for the second one or more PUCCH communications. The one or more instructions, when executed by one or more processors of the network node, may cause the network node to receive the first one or more PUCCH communications in accordance with the first transmit power configuration and the second one or more PUCCH communications in accordance with the second transmit power configuration.

Some aspects described herein relate to an apparatus for wireless communication. The apparatus may include means for transmitting DCI scheduling transmission of a first one or more PUCCH communications on a first component carrier and a second one or more PUCCH communications on a second component carrier, wherein the DCI includes information identifying a first transmit power configuration for the first one or more PUCCH communications and a second transmit power configuration for the second one or more PUCCH communications. The apparatus may include means for receiving the first one or more PUCCH communications in accordance with the first transmit power configuration and the second one or more PUCCH communications in accordance with the second transmit power configuration.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of physical channels and reference signals in a wireless network, in accordance with the present disclosure.

FIGS. 6-7 are diagrams illustrating example processes associated with TPC configuration for PUCCH repetition across multiple component carriers, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
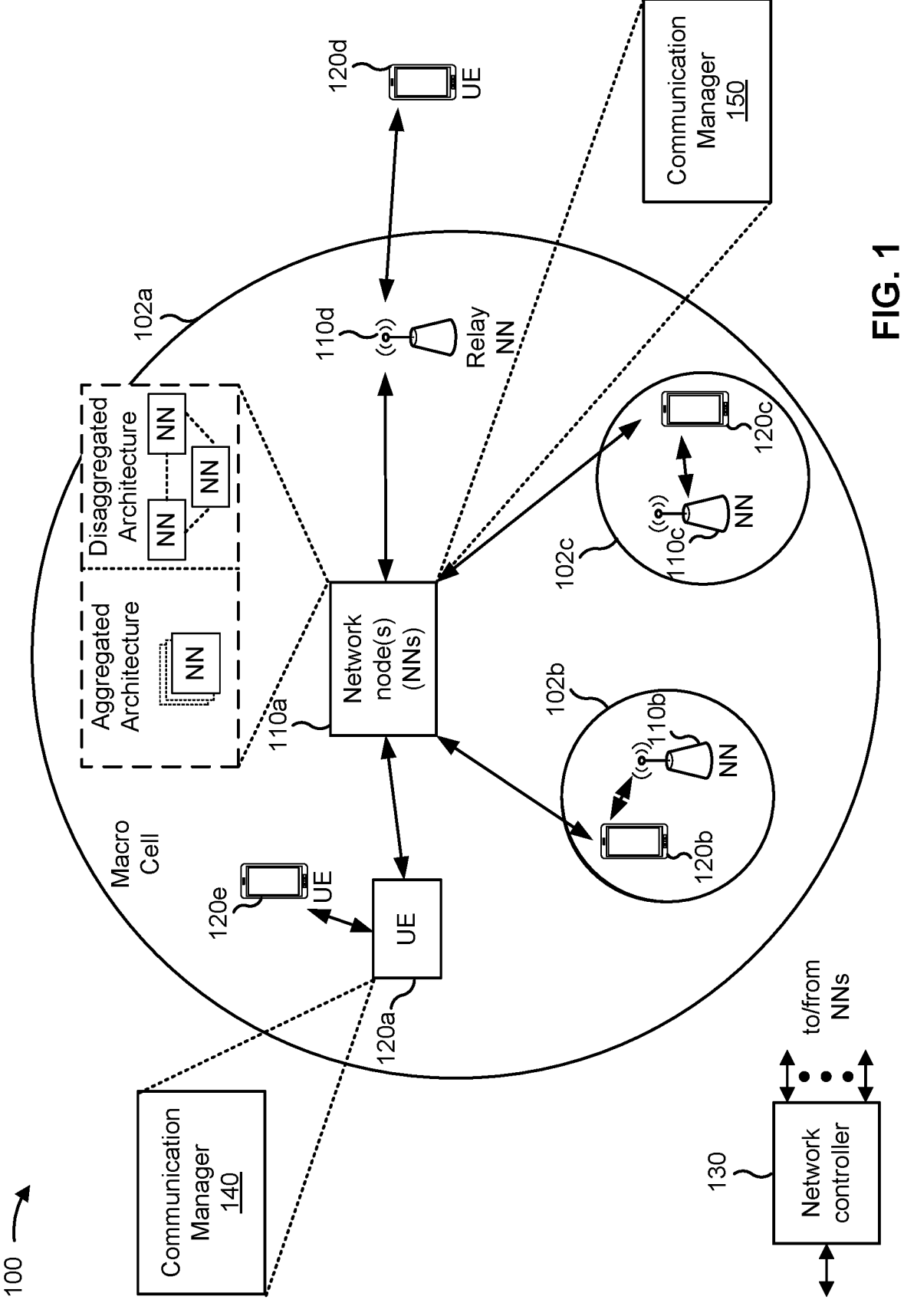
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive downlink control information (DCI) scheduling transmission of a first one or more physical uplink control channel (PUCCH) communications on a first component carrier and a second one or more PUCCH communications on a second component carrier, wherein the DCI includes information identifying a first transmit power configuration for the first one or more PUCCH communications and a second transmit power configuration for the second one or more PUCCH communications; and transmit the first one or more PUCCH communications in accordance with the first transmit power configuration and the second one or more PUCCH communications in accordance with the second transmit power configuration. Additionally, or alternatively, the communication manager 140 may perform one or more other operations described herein.

In some aspects, the network node 110 may include a communication manager 150. As described in more detail elsewhere herein, the communication manager 150 may transmit DCI scheduling transmission of a first one or more PUCCH communications on a first component carrier and a second one or more PUCCH communications on a second component carrier, wherein the DCI includes information identifying a first transmit power configuration for the first one or more PUCCH communications and a second transmit power configuration for the second one or more PUCCH communications; and receive the first one or more PUCCH communications in accordance with the first transmit power configuration and the second one or more PUCCH communications in accordance with the second transmit power configuration. Additionally, or alternatively, the communication manager 150 may perform one or more other operations described herein.

As indicated above, FIG. 1 is provided as an example. Other examples may differ from what is described with regard to FIG. 1.

Figure 2:
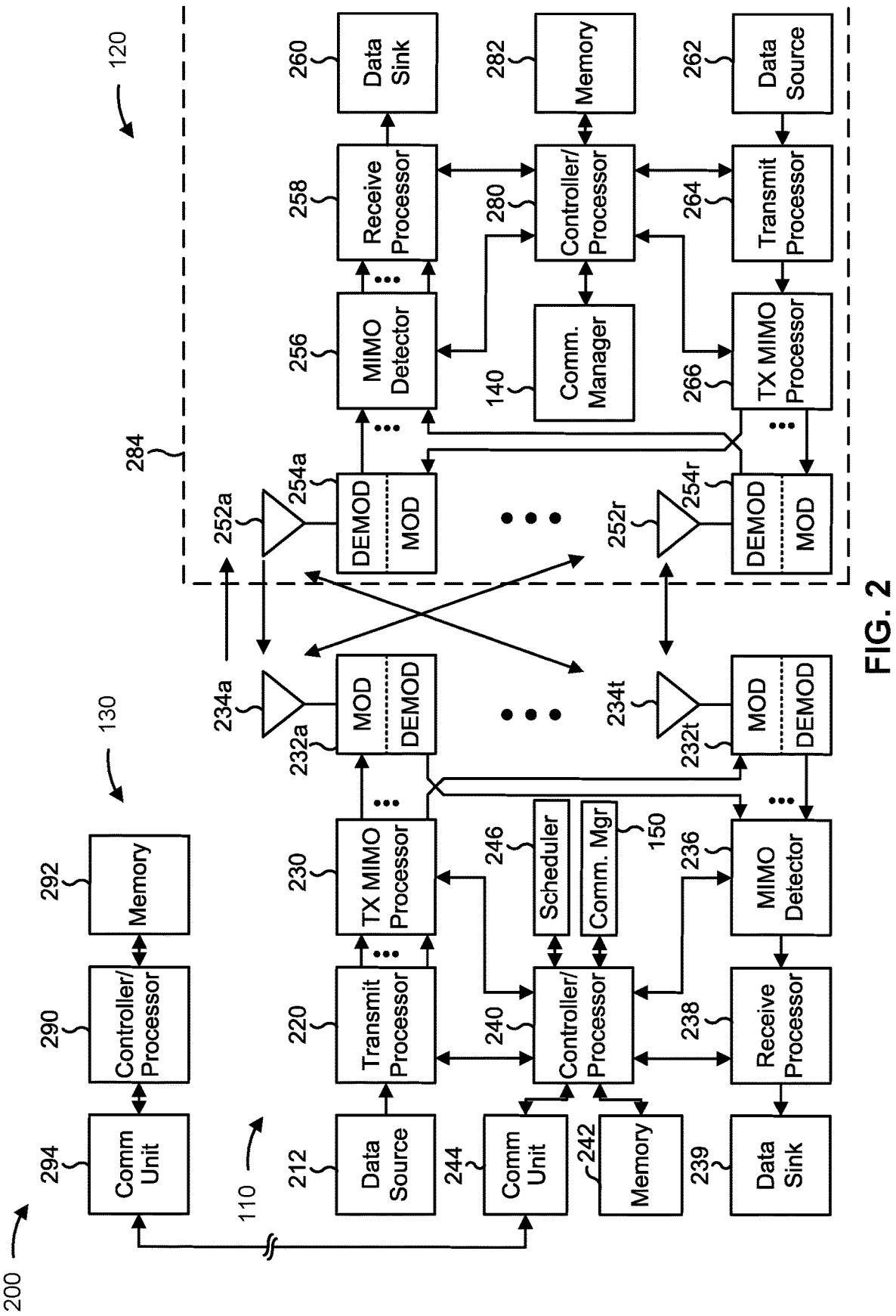
FIG. 2 is a diagram illustrating an example of a base station in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the network node 110, the controller/processor 280 of the UE 120, and/or any other component(s) of FIG. 2 may perform one or more techniques associated with transmit power control (TPC) configuration for PUCCH repetition across multiple component carriers, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a user equipment (e.g., the UE 120) includes means for receiving DCI scheduling transmission of a first one or more PUCCH communications on a first component carrier and a second one or more PUCCH communications on a second component carrier, wherein the DCI includes information identifying a first transmit power configuration for the first one or more PUCCH communications and a second transmit power configuration for the second one or more PUCCH communications; and/or means for transmitting the first one or more PUCCH communications in accordance with the first transmit power configuration and the second one or more PUCCH communications in accordance with the second transmit power configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting DCI scheduling transmission of a first one or more PUCCH communications on a first component carrier and a second one or more PUCCH communications on a second component carrier, wherein the DCI includes information identifying a first transmit power configuration for the first one or more PUCCH communications and a second transmit power configuration for the second one or more PUCCH communications; and/or means for receiving the first one or more PUCCH communications in accordance with the first transmit power configuration and the second one or more PUCCH communications in accordance with the second transmit power configuration. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIG. 3 is a diagram illustrating an example 300 of physical channels and reference signals in a wireless network, in accordance with the present disclosure. As shown in FIG. 3, downlink channels and downlink reference signals may carry information from a network node 110 to a UE 120, and uplink channels and uplink reference signals may carry information from a UE 120 to a network node 110.

As shown, a downlink channel may include a physical downlink control channel (PDCCH) that carries DCI, a physical downlink shared channel (PDSCH) that carries downlink data, or a physical broadcast channel (PBCH) that carries system information, among other examples. PDSCH communications may be scheduled by PDCCH communications. As further shown, an uplink channel may include a PUCCH that carries uplink control information (UCI), a physical uplink shared channel (PUSCH) that carries uplink data, or a physical random access channel (PRACH) used for initial network access, among other examples. For example, the UE 120 may transmit repetitions of UCI via a PUCCH across a plurality of component carriers (e.g., a first instance of the UCI in a first component carrier and a second instance (a repetition) of the UCI in a second component carrier). The UCI may convey feedback information. For example, the UE 120 may transmit acknowledgement (ACK) or negative acknowledgement (NACK) feedback (e.g., ACK/NACK feedback or ACK/NACK information) in UCI on the PUCCH and/or the PUSCH.

Different PUCCH formats may be possible. For example, PUCCH formats with different durations, payload size ranges, and multiplexing capabilities are defined for 5G communications (e.g., PUCCH formats 0 to 4), as described in more detail with regard to 3GPP Technical Specification (TS) 38.213, Release 16, Version 16.6.0, Section 9.2.2. The UE 120 may receive radio resource control (RRC) signaling configuring resources (e.g., up to 128 resources) for PUCCH communication and a PUCCH format to use in each resource. In scenarios where HARQ-ACK feedback is multiplexed in a PUCCH resource, the UE 120 may receive DCI (e.g., a DCI format that schedules a PDSCH and a corresponding PUCCH for HARQ-ACK feedback) that indicates a PUCCH resource indicator (PRI). In these scenarios, the UE 120 may select a PUCCH resource set based at least in part on a UCI payload and may select a PUCCH resource within the PUCCH resource set based at least in part on the PRI. In this way, the UE 120 may dynamically select PUCCH resources for HARQ-ACK transmission.

PUCCH communications may be repeated across a plurality of slots for some PUCCH formats, such as PUCCH formats 1, 3, and 4. The UE 120 may receive an RRC indication of a quantity of repetitions to transmit for each PUCCH format. As a result, all PUCCH resources with a particular format may have the same quantity of repetitions. Moreover, the UE 120 may use the same PUCCH resource across all repetitions in different slots. In other words, the UE 120 may use the same symbols (e.g., the same starting symbol and length) in each slot in which the UE 120 transmits PUCCH repetitions. As a result, each PUCCH repetition may have the same quantity of coded bits and the same resource identifier (ID). The quantity of repetitions can be configured on a per PUCCH resource basis (rather than a per PUCCH format basis). In this case, the PRI in DCI may dynamically indicate a PUCCH resource with a particular quantity of repetitions, thereby enabling dynamic configuration of a quantity of PUCCH repetitions. "PUCCH repetitions" or repetitions of a "PUCCH communication" may refer to repetitions of the same UCI across a plurality of PUCCH resources.

The UE 120 may be configured with a single power adjustment state (e.g., a closed loop index l=0) or two separate power adjustment states (e.g., a closed loop index of l=0,1) for power adjustment for PUCCH transmission. When the UE 120 has two separate adjustment states, each PUCCH resource is configured and/or activated with a TPC adjustment for l=0 or l=1. The UE 120 may maintain power adjustment states based at least in part on TPC commands received from the network node 110 in DCI. In other words, TPC commands are accumulated per power adjustment state. Accordingly, DCI formats that network node 110 uses to schedule downlink (e.g., a PDSCH) and uplink (e.g., a PUCCH for a HARQ-ACK response to the PDSCH), such as DCI format 1_0, 1_1, or 1_2, include a TPC field for closed loop power adjustment for a scheduled PUCCH. Similarly, network node 110 may use DCI format 2_2 (e.g., a group-common DCI) with a cyclic redundancy check (CRC) scrambled with a TPC-PUCCH-radio network temporary identifier (RNTI) to indicate a closed loop index and a TPC command for a group of UEs 120.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. The network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a CQI, a precoding matrix indicator (PMI), a CSI-RS resource indicator (CRI), a layer indicator (LI), a rank indicator (RI), or a reference signal received power (RSRP), among other examples. The network node 110 may use the CSI report to select transmission parameters for downlink communications to the UE 120, such as a number of transmission layers (e.g., a rank), a precoding matrix (e.g., a precoder), a MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. The network node 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
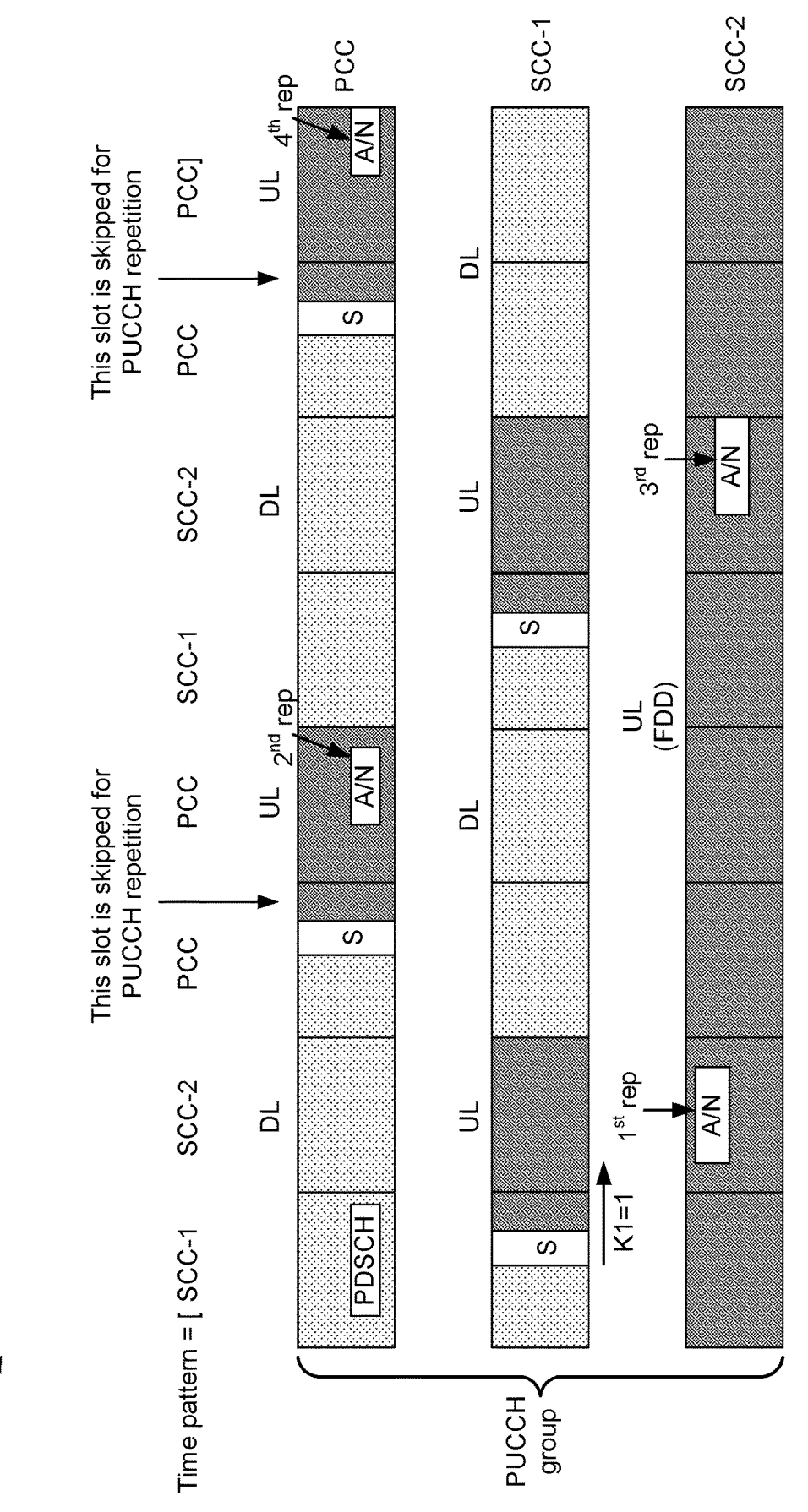
FIG. 4 is a diagram illustrating an example of physical uplink control channel (PUCCH) repetition across multiple component carriers, in accordance with the present disclosure.

FIG. 4 is a diagram illustrating an example 400 of PUCCH repetition across multiple component carriers, in accordance with the present disclosure.

In some communications systems, in uplink carrier aggregation, a UE may transmit a PUCCH in a primary component carrier (PCC) of a PUCCH group and not in any secondary component carriers (SCCs) (e.g., a first SCC, SCC-1, or a second SCC, SCC-2) of the PUCCH group. In other communications systems, the UE may switch between component carriers within a PUCCH group, such as switching between a PCC, a first SCC-1, and a second SCC-2. As shown, a switching period (S) (e.g., a guard period) may be allocated for switching between different directions of communication (e.g., between downlink communication and uplink communication). The UE may switch based at least in part on an indication received from a network node. The network node may indicate on which component carrier the UE is to transmit a repetition of a PUCCH in a slot. For example, the network node may transmit a DCI or an RRC message to indicate the component carrier on which the UE is to transmit a PUCCH or a PUCCH repetition in a slot. When using DCI (e.g., dynamic indication), the network node may set a field to provide the indication. When using RRC (e.g., semi-static indication), the network node may identify a time pattern that provides a periodicity for component carrier switching.

As shown in FIG. 4, the UE may receive a PDSCH on a PCC, and may transmit repetitions of a PUCCH (e.g., repetitions of UCI conveying a HARQ-ACK for the PDSCH) on the PCC and on SCC-2 in accordance with a component carrier switching configuration set by the network node (e.g., a time pattern for transmitting on the PCC, SCC-1, and SCC-2). However, each component carrier may have a separate closed loop power adjustment state. For example, the PCC may have a first closed loop power adjustment state and the SCC-2 may have a second closed loop power adjustment state. When the network node uses certain DCI formats, such as DCI format 1_0, 1_1, or 1_2, to schedule the PUCCH resources, the DCI formats may only include a single TPC field. Without UE behavior defined for scenarios with multiple closed loop power adjustment states, the UE may adjust transmit powers in a manner different than what is expected by the network node, which can result in synchronization issues, dropped communications, or interference, among other examples.

As indicated above, FIG. 4 is provided as an example. Other examples may differ from what is described with respect to FIG. 4.

Some aspects described herein enable power control on multiple component carriers when transmitting PUCCH repetitions across the multiple component carriers. For example, a UE may apply a single TPC command to multiple closed loop power adjustment states associated with multiple component carriers. In another example, the UE may apply the single TPC command to one closed loop power adjustment state associated with one component carrier (and may not adjust a closed loop power adjustment state of another component carrier). In another example, the network node may configure multiple TPC fields in the DCI and the UE may apply respective TCI commands in the multiple TCI fields to respective closed loop power adjustment states associated with respective component carriers. In another example, the UE may map the single TPC field to multiple TPC commands in accordance with a configured mapping. In some aspects, the UE may switch between options for applying received TPC commands based at least in part on received semi-static or dynamic signaling. In this way, the UE transmits PUCCH repetitions across component carriers with different closed loop power adjustment states with transmit powers configured in accordance with one or more TPC commands from a network node.

Figure 5:
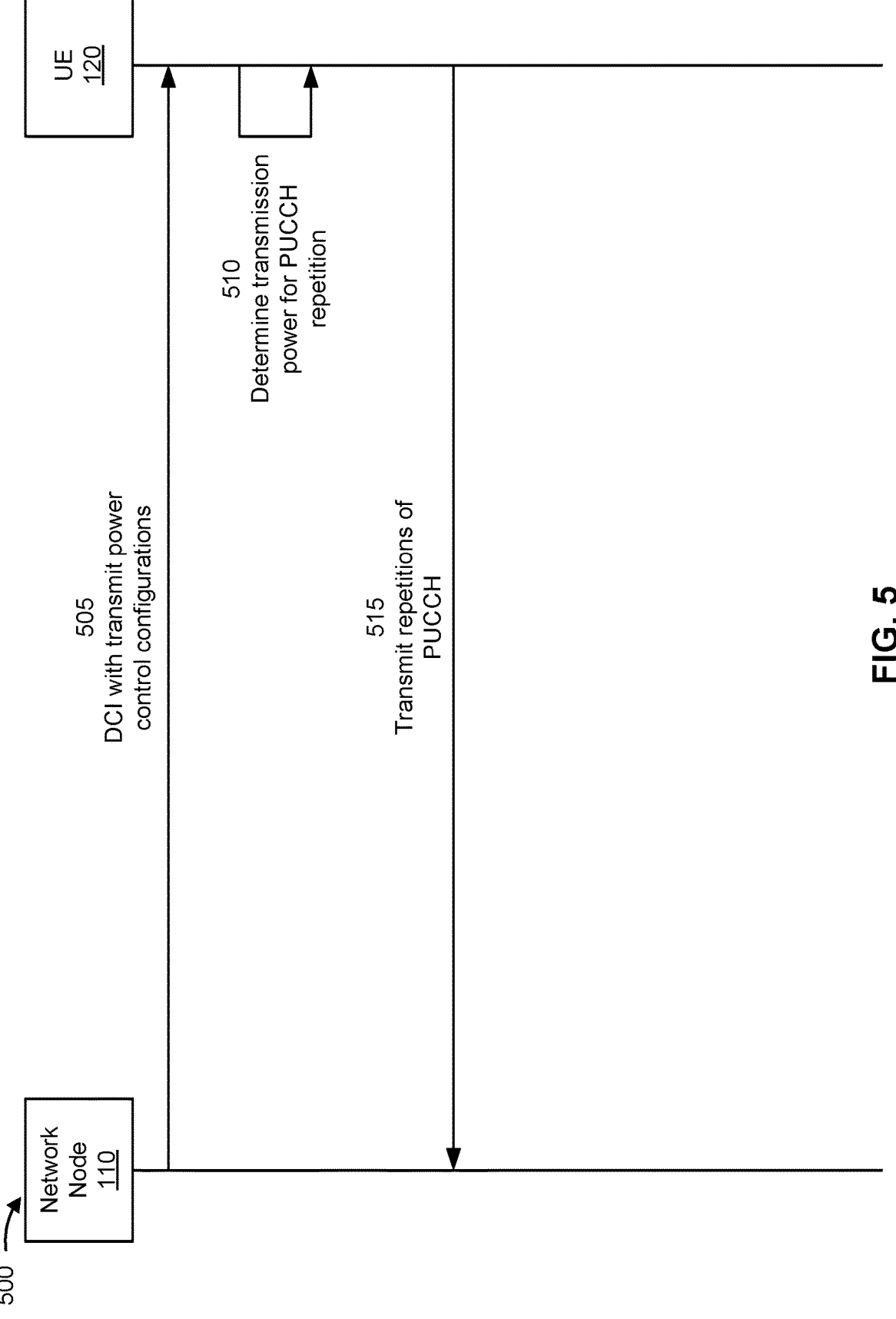
FIG. 5 is a diagram illustrating an example associated with transmit power control (TPC) configuration for PUCCH repetition across multiple component carriers, in accordance with the present disclosure.

FIG. 5 is a diagram illustrating an example 500 associated with TPC configuration for PUCCH repetition across multiple component carriers, in accordance with the present disclosure. As shown in FIG. 5, example 500 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As further shown in FIG. 5, and by reference number 505, the UE 120 may receive DCI with information identifying one or more TPC configurations. For example, the UE 120 may receive DCI scheduling a first one or more PUCCH communications on a first component carrier and a second one or more PUCCH communications on a second component carrier. In this case, the first one or more PUCCH communications may include a first one or more repetitions of UCI including a HARQ-ACK for a PDSCH and the second one or more PUCCH communications may include a second one or more repetitions of the UCI including the HARQ-ACK for the PDSCH. In other words, the first one or more PUCCH communications and the second one or more PUCCH communications may comprise a set of PUCCH repetitions of UCI conveying a HARQ-ACK. In some aspects, the DCI may be associated with a particular format. For example, the UE 120 may receive DCI associated with DCI format 1_0, 1_1, or 1_2, among other examples.

In some aspects, the UE 120 may receive DCI with a particular quantity of TPC commands. For example, the UE 120 may receive DCI with a single TPC command. Alternatively, the UE 120 may receive DCI with a plurality of TPC commands applicable to a corresponding plurality of component carriers. Alternatively, the UE 120 may receive a TPC command that is a TPC field codepoint that maps to a set of TPC commands. In this case, a bitwidth of the TPC field may be increased from 2 bits (e.g., for a single TPC command) to 3 bits (e.g., for a TPC field codepoint) to enable the TPC field to map to a greater quantity of sets of TPC commands (e.g., a 3 bit TPC field codepoint can map to up to 8 different possible sets of TPC commands) In some aspects, the UE 120 may receive an indicator of an option for applying a TPC command of the DCI. For example, the UE 120 may receive an indicator (e.g., in the DCI or as a semi-static RRC configuration) indicating whether a second TPC field is present in the DCI, whether the TPC field codepoint can indicate multiple TPC commands, or whether a single TPC command is to be applied to a single or multiple transmit power configurations, among other examples.

As further shown in FIG. 5, and by reference number 510, the UE 120 may determine transmission powers for PUCCH repetitions. For example, the UE 120 may apply the TPC command to one or more transmit power configurations (e.g., one or more closed loop adjustment states) corresponding to one or more component carriers. In some aspects, the UE 120 may apply a single TPC command to a plurality of transmit power configurations. For example, the UE 120 may apply a single TPC command of the DCI to both a first transmit power configuration (e.g., a first closed loop power adjustment state) associated with a first component carrier and a second transmit power configuration (e.g., a second closed loop power adjustment state) associated with a second component carrier.

In some aspects, the UE 120 may apply a single TPC command to a single transmit power configuration. For example, the UE 120 may apply the single TPC command of the DCI to a first transmit power configuration and may not apply any TPC command to a second transmit power configuration. In this case, as closed loop power adjustment states are accumulative, a first closed loop power adjustment state may be changed by the TPC command and a second closed loop power adjustment state may be unchanged by the TPC command (e.g., the UE 120 may change transmit powers for a first component carrier, but use a previous transmit power for a second component carrier). In some aspects, the UE 120 may select which transmit power configuration to which to apply the single TPC command. For example, the UE 120 may select a component carrier with a smaller index and apply the single TPC command to a corresponding transmit power configuration. Additionally, or alternatively, the UE 120 may use another type of default configuration (e.g., alternating which component carrier to which to apply the single TPC command or applying the single TPC command to a larger indexed component carrier, among other examples).

In some aspects, the UE 120 may interpret an indicator to select which transmit power configuration to which to apply the single TPC command. For example, the UE 120 may identify a bit indicator in the DCI that indicates to which component carrier the single TPC command applies. Additionally, or alternatively, the UE 120 may implicitly derive which component carrier the single TPC command applies based at least in part on a slot or component carrier in which the DCI is received. In this way, the UE 120 remains synchronized with the network node 110 by deterministically applying the single TPC command to one of a plurality of transmit power configurations. In some aspects, the UE 120 may apply the single TPC command to multiple component carriers at different times based at least in part on different scheduling instances.

In some aspects, the UE 120 may apply different TPC commands to different component carriers. For example, when the network node 110 adds a second TPC field to the DCI (e.g., by adding a new dedicated field or repurposing a configurable field in accordance with a defined agreement with the UE 120), the UE 120 may apply a first TPC command of a first TPC field to a first transmit power configuration associated with a first component carrier and a second TPC command of a second TPC field to a second transmit power configuration associated with a second component carrier.

In some aspects, the UE 120 may identify a plurality of TPC commands by mapping a TPC field codepoint to the plurality of TPC commands. For example, the UE 120 may identify a value for a TPC field codepoint in the DCI and may map the value to a table that includes pairs of TPC commands. In other words, a first codepoint value maps to an index in a table with a first pair of TPC commands (e.g., the same or different TPC commands), a second codepoint value maps to an index in the table with a second pair of TPC commands (e.g., the same or different TPC commands), and so on. Although some aspects are described in terms of a pair of TPC commands, the table may include another quantity of TPC commands (e.g., for another quantity of component carriers) for each codepoint value. In this case, a size of the TPC field codepoint (e.g., a quantity of bits) may correspond to a quantity of possible pairs of TPC commands. Accordingly, in some aspects, the TPC field may be increased from 2 bits to 3 bits to increase a quantity of possible pairs of TPC commands that can be indicated using a field codepoint.

In some aspects, the UE 120 may determine an option for applying the TPC command of the DCI based at least in part on a received configuration. For example, as described above, the UE 120 may receive an RRC configuration or an indicator in the DCI that indicates whether, for example, to apply a single TPC command to multiple transmit power configurations or a single transmit power configuration. Additionally, or alternatively, the UE 120 may receive an indicator of whether the DCI includes multiple TPC fields or an extended TPC field (e.g., for a field codepoint, as described above). Additionally, or alternatively, the UE 120 may determine the option for applying the TPC command based at least in part on a default configuration, a type of the DCI (e.g., a format of the DCI), or another type of indicator or interpretation technique. For example, when DCI format 1_0 (e.g., a fallback DCI) is used, the TPC command in the TPC field is applied to multiple transmit power configurations or a single transmit power configuration (e.g., for DCI format 1_0, adding a second TPC field or a different interpretation of TPC field, such as using TPC field codepoints, as described above, may not be configured).

As further shown in FIG. 5, and by reference number 515, the UE 120 may transmit repetitions of a PUCCH across a plurality of component carriers. For example, the UE 120 may transmit repetitions of UCI (e.g., HARQ-ACK feedback for a PDSCH) in resources of a PUCCH occurring on the plurality of component carriers. In this case, the UE 120 may transmit a first instance of the UCI on a first component carrier using a first transmit power based at least in part on a first transmit power configuration and a second instance of the UCI on a second component carrier using a second transmit power based at least in part on a second transmit power configuration.

As indicated above, FIG. 5 is provided as an example. Other examples may differ from what is described with respect to FIG. 5.

FIG. 6 is a diagram illustrating an example process 600 performed, for example, by a UE, in accordance with the present disclosure. Example process 600 is an example where the UE (e.g., the UE 120) performs operations associated with TPC configuration for PUCCH repetition across multiple component carriers.

As shown in FIG. 6, in some aspects, process 600 may include receiving DCI scheduling transmission of a first one or more PUCCH communications on a first component carrier and a second one or more PUCCH communications on a second component carrier (block 610). For example, the UE (e.g., using communication manager 140 and/or reception component 802, depicted in FIG. 8) may receive DCI scheduling transmission of a first one or more PUCCH communications on a first component carrier and a second one or more PUCCH communications on a second component carrier. In some aspects, the DCI includes information identifying a first transmit power configuration for the first one or more PUCCH communications and a second transmit power configuration for the second one or more PUCCH communications, as described above.

As further shown in FIG. 6, in some aspects, process 600 may include transmitting the first one or more PUCCH communications in accordance with the first transmit power configuration and the second one or more PUCCH communications in accordance with the second transmit power configuration (block 620). For example, the UE (e.g., using communication manager 140 and/or transmission component 804, depicted in FIG. 8) may transmit the first one or more PUCCH communications in accordance with the first transmit power configuration and the second one or more PUCCH communications in accordance with the second transmit power configuration, as described above.

Process 600 may include additional aspects, such as any single aspect or any combination of aspects described below and/or in connection with one or more other processes described elsewhere herein.

In a first aspect, the first one or more PUCCH communications comprise a first one or more repetitions of a UCI message and the second one or more PUCCH communications comprise a second one or more repetitions of the UCI message.

In a second aspect, alone or in combination with the first aspect, the DCI includes a single TPC command, and wherein the first transmit power configuration and the second transmit power configuration are based at least in part on the single TPC command.

In a third aspect, alone or in combination with one or more of the first and second aspects, the DCI includes a single TPC command, and wherein one of the first transmit power configuration or the second transmit power configuration is based at least in part on the single TPC command.

In a fourth aspect, alone or in combination with one or more of the first through third aspects, the first component carrier is associated with a first index and the second component carrier is associated with a second index, and wherein the one of the first transmit power configuration or the second transmit power configuration derived from the single TPC command is based at least in part on at least one of the first index or the second index.

In a fifth aspect, alone or in combination with one or more of the first through fourth aspects, the one of the first transmit power configuration or the second transmit power configuration derived from the single TPC command is based at least in part on at least one of a bit indicator of the DCI or a configuration of the DCI.

In a sixth aspect, alone or in combination with one or more of the first through fifth aspects, the DCI includes a first TPC field with a first value and a second TPC field with a second value, and wherein the first transmit power configuration is based at least in part on the first value of the first TPC field and the second transmit power configuration is based at least in part on the second value of the second TPC field.

In a seventh aspect, alone or in combination with one or more of the first through sixth aspects, the DCI includes a single TPC field that maps to a pair of TPC commands, wherein the first transmit power configuration is based at least in part on a first TPC command of the pair of TPC commands and the second transmit power configuration is based at least in part on a second TPC command of the pair of TPC commands.

In an eighth aspect, alone or in combination with one or more of the first through seventh aspects, the TPC field is a 3 bit field.

In a ninth aspect, alone or in combination with one or more of the first through eighth aspects, a mapping of the TPC field to different TPC commands is a fixed mapping or a radio resource control configured mapping.

In a tenth aspect, alone or in combination with one or more of the first through ninth aspects, the first transmit power configuration and the second transmit power configuration are based at least in part on a format of the DCI.

In an eleventh aspect, alone or in combination with one or more of the first through tenth aspects, a radio resource control configuration indicates a configuration for applying TPC information of the DCI to at least one of the first transmit power configuration or the second transmit power configuration, and wherein the configuration for applying the TPC information indicates at least one of that the DCI includes a single TPC command applicable to the first transmit power configuration and the second transmit power configuration, that the DCI includes a single TPC command applicable to one of the first transmit power configuration or the second transmit power configuration in accordance with the configuration for applying the TPC information, that the DCI includes a first TPC command applicable to the first transmit power configuration and a second TPC command applicable to the second transmit power configuration, or that the DCI includes a single TPC field that maps to a pair of TPC commands respective corresponding to the first transmit power configuration and the second transmit power configuration.

In a twelfth aspect, alone or in combination with one or more of the first through eleventh aspects, the DCI schedules a downlink shared channel communication and schedules an uplink control channel communication with a plurality of repetitions across a plurality of component carriers for transmitting a feedback message corresponding to the downlink shared channel.

In a thirteenth aspect, alone or in combination with one or more of the first through twelfth aspects, the plurality of component carriers includes a first component carrier associated with a first closed loop power adjustment state corresponding to the first transmit power configuration and a second component carrier associated with a second closed loop power adjustment state corresponding to the second transmit power configuration.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a network node, in accordance with the present disclosure. Example process 700 is an example where the network node (e.g., network node 110)

performs operations associated with TPC configuration for PUCCH repetition across multiple component carriers.

As shown in FIG. 7, in some aspects, process 700 may include transmitting DCI scheduling transmission of a first one or more PUCCH communications on a first component carrier and a second one or more PUCCH communications on a second component carrier (block 710). For example, the network node (e.g., using communication manager 150 and/or transmission component 904, depicted in FIG. 9) may transmit DCI scheduling transmission of a first one or more PUCCH communications on a first component carrier and a second one or more PUCCH communications on a second component carrier. In some aspects, the DCI includes information identifying a first transmit power configuration for the first one or more PUCCH communications and a second transmit power configuration for the second one or more PUCCH communications, as described above.

As further shown in FIG. 7, in some aspects, process 700 may include receiving the first one or more PUCCH communications in accordance with a first transmit power configuration and the second one or more PUCCH communications in accordance with the second transmit power configuration (block 720). For example, the network node (e.g., using communication manager 150 and/or reception component 902, depicted in FIG. 9) may receive the first one or more PUCCH communications in accordance with the first transmit power configuration and the second one or more PUCCH communications in accordance with the second transmit power configuration, as described above.

Process 700 may include additional aspects, such as any single aspect or any combination of aspects described below and/or in connection with one or more other processes described elsewhere herein.

In a first aspect, the first one or more PUCCH communications comprise a first one or more repetitions of a UCI message and the second one or more PUCCH communications comprise a second one or more repetitions of the UCI message.

In a second aspect, alone or in combination with the first aspect, the DCI includes a single TPC command, and wherein the first transmit power configuration and the second transmit power configuration are based at least in part on the single TPC command.

In a third aspect, alone or in combination with one or more of the first and second aspects, the DCI includes a single TPC command, and wherein one of the first transmit power configuration or the second transmit power configuration is based at least in part on the single TPC command.

In a fourth aspect, alone or in combination with one or more of the first through third aspects, the first component carrier is associated with a first index and the second component carrier is associated with a second index, and wherein the one of the first transmit power configuration or the second transmit power configuration derived from the single TPC command is based at least in part on at least one of the first index or the second index.

In a fifth aspect, alone or in combination with one or more of the first through fourth aspects, the one of the first transmit power configuration or the second transmit power configuration derived from the single TPC command is based at least in part on at least one of a bit indicator of the DCI or a configuration of the DCI.

In a sixth aspect, alone or in combination with one or more of the first through fifth aspects, the DCI includes a first TPC field with a first value and a second TPC field with a second value, and wherein the first transmit power configuration is based at least in part on the first value of the first TPC field and the second transmit power configuration is based at least in part on the second value of the second TPC field.

In a seventh aspect, alone or in combination with one or more of the first through sixth aspects, the DCI includes a single TPC field that maps to a pair of TPC commands, wherein the first transmit power configuration is based at least in part on a first TPC command of the pair of TPC commands and the second transmit power configuration is based at least in part on a second TPC command of the pair of TPC commands.

In an eighth aspect, alone or in combination with one or more of the first through seventh aspects, the TPC field is a 3 bit field.

In a ninth aspect, alone or in combination with one or more of the first through eighth aspects, a mapping of the TPC field to different TPC commands is a fixed mapping or a radio resource control configured mapping.

In a tenth aspect, alone or in combination with one or more of the first through ninth aspects, the first transmit power configuration and the second transmit power configuration are based at least in part on a format of the DCI.

In an eleventh aspect, alone or in combination with one or more of the first through tenth aspects, a radio resource control configuration indicates a configuration for applying TPC information of the DCI to at least one of the first transmit power configuration or the second transmit power configuration, and wherein the configuration for applying the TPC information indicates at least one of that the DCI includes a single TPC command applicable to the first transmit power configuration and the second transmit power configuration, that the DCI includes a single TPC command applicable to one of the first transmit power configuration or the second transmit power configuration in accordance with the configuration for applying the TPC information, that the DCI includes a first TPC command applicable to the first transmit power configuration and a second TPC command applicable to the second transmit power configuration, or that the DCI includes a single TPC field that maps to a pair of TPC commands respective corresponding to the first transmit power configuration and the second transmit power configuration.

In a twelfth aspect, alone or in combination with one or more of the first through eleventh aspects, the DCI schedules a downlink shared channel communication and schedules an uplink control channel communication with a plurality of repetitions across a plurality of component carriers for transmitting a feedback message corresponding to the downlink shared channel.

In a thirteenth aspect, alone or in combination with one or more of the first through twelfth aspects, the plurality of component carriers includes a first component carrier associated with a first closed loop power adjustment state corresponding to the first transmit power configuration and a second component carrier associated with a second closed loop power adjustment state corresponding to the second transmit power configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
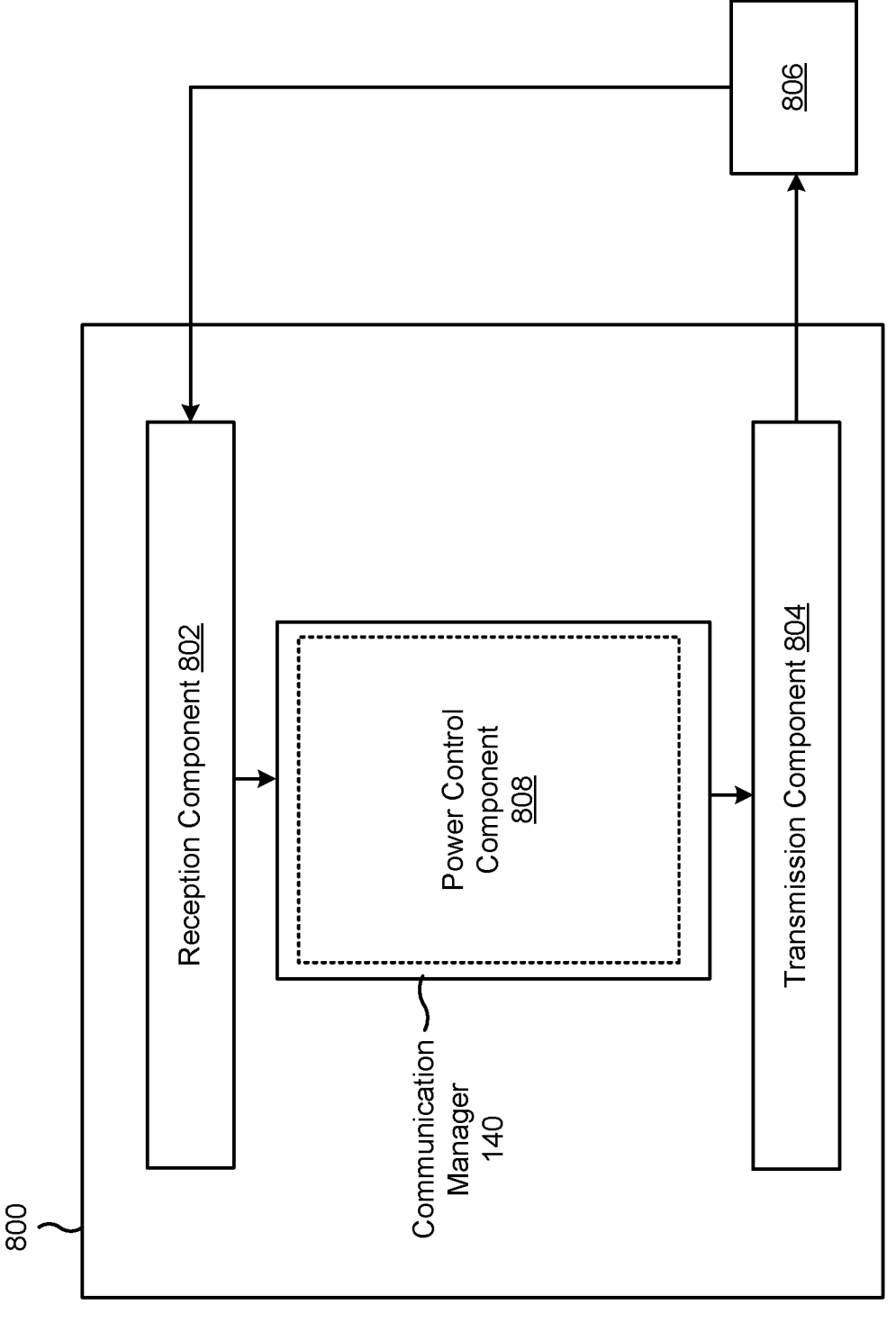
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a network node, or another wireless communication device) using the reception component 802 and the transmission component 804. As further shown, the apparatus 800 may include the communication manager 140. The communication manager 140 may include a power control component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive DCI scheduling transmission of a first one or more PUCCH communications on a first component carrier and a second one or more PUCCH communications on a second component carrier, wherein the DCI includes information identifying a first transmit power configuration for the first one or more PUCCH communications and a second transmit power configuration for the second one or more PUCCH communications. The transmission component 804 may transmit the first one or more PUCCH communications in accordance with the first transmit power configuration and the second one or more PUCCH communications in accordance with the second transmit power configuration. Power control component 808 may perform transmit power control on a plurality of closed loop power control instances for a plurality of component carriers based at least in part on the first transmit power configuration and the second transmit power configuration.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
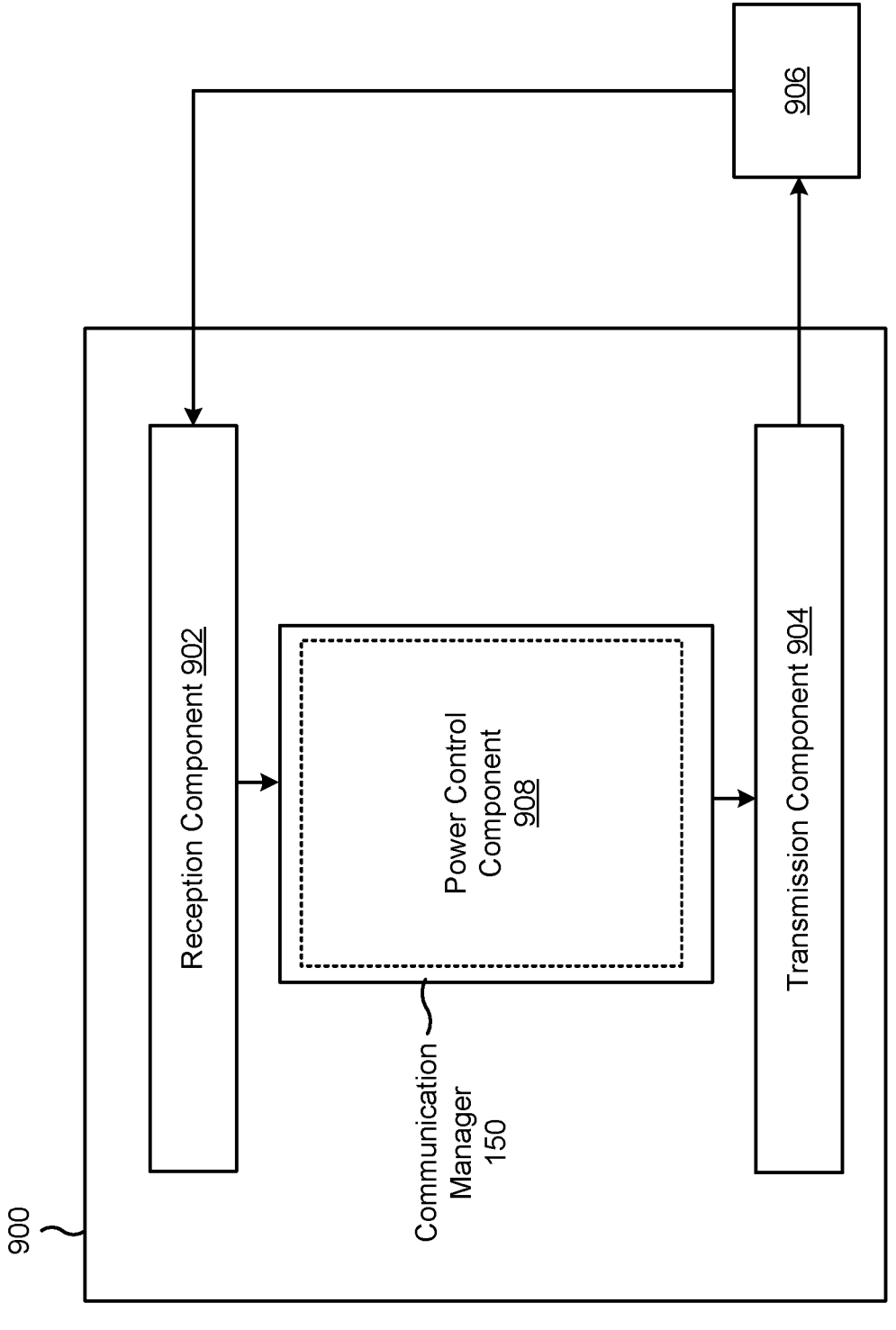

FIG. 9 is a diagram of an example apparatus 900 for wireless communication. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network node, or another wireless communication device) using the reception component 902 and the transmission component 904. As further shown, the apparatus 900 may include the communication manager 150. The communication manager 150 may include a power control component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The transmission component 904 may transmit DCI scheduling transmission of a first one or more PUCCH communications on a first component carrier and a second one or more PUCCH communications on a second component carrier, wherein the DCI includes information identifying a first transmit power configuration for the first one or more PUCCH communications and a second transmit power configuration for the second one or more PUCCH communications. The reception component 902 may receive the first one or more PUCCH communications in accordance with the first transmit power configuration and the second one or more PUCCH communications in accordance with the second transmit power configuration. Power control component 908 may determine TPC commands and/or power adjustments to communicate to the apparatus 906 to adjust transmit powers for the PUCCH communications.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
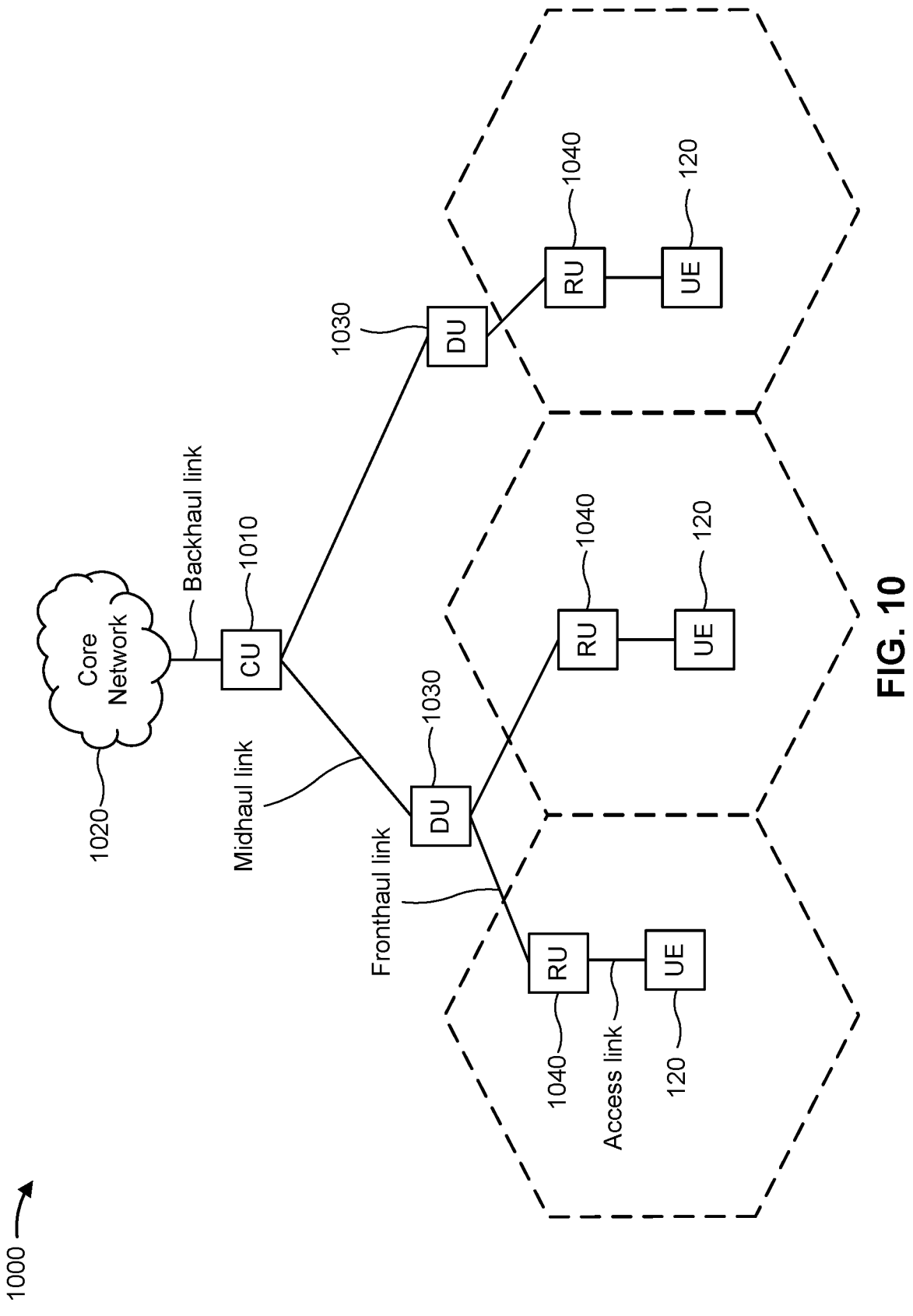
FIG. 10 is a diagram illustrating an example of an open radio access network (O-RAN) architecture, in accordance with the present disclosure.

FIG. 10 is a diagram illustrating an example 1000 of an O-RAN architecture, in accordance with the present disclosure. As shown in FIG. 10, the O-RAN architecture may include a CU 1010 that communicates with a core network 1020 via a backhaul link. Furthermore, the CU 1010 may communicate with one or more DUs 1030 via respective midhaul links. The DUs 1030 may each communicate with one or more RUs 1040 via respective fronthaul links, and the RUs 1040 may each communicate with respective UEs 120 via radio frequency (RF) access links. The DUs 1030 and the RUs 1040 may also be referred to as O-RAN DUs (O-DUs) 1030 and O-RAN RUs (O-RUs) 1040, respectively.

In some aspects, the DUs 1030 and the RUs 1040 may be implemented according to a functional split architecture in which functionality of a network node 110 (e.g., an eNB or a gNB) is provided by a DU 1030 and one or more RUs 1040 that communicate over a fronthaul link. Accordingly, as described herein, a network node 110 may include a DU 1030 and one or more RUs 1040 that may be co-located or geographically distributed. In some aspects, the DU 1030 and the associated RU(s) 1040 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 1030 may correspond to a logical unit that includes one or more base station functions to control the operation of one or more RUs 1040. For example, in some aspects, the DU 1030 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), RRC, and/or service data adaptation protocol (SDAP), may be hosted by the CU 1010. The RU(s) 1040 controlled by a DU 1030 may correspond to logical nodes that host RF processing functions and low-PHY layer functions (e.g., fast Fourier transform (FFT), inverse FFT (iFFT), digital beamforming, and/or PRACH extraction and filtering) based at least in part on the lower layer functional split. Accordingly, in an O-RAN architecture, the RU(s) 1040 handle all over the air (OTA) communication with a UE 120, and real-time and non-real-time aspects of control and user plane communication with the RU(s) 1040 are controlled by the corresponding DU 1030, which enables the DU(s) 1030 and the CU 1010 to be implemented in a cloud-based RAN architecture.

As indicated above, FIG. 10 is provided as an example. Other examples may differ from what is described with regard to FIG. 10.

The following provides an overview of some Aspects of the present disclosure:

Aspect 1: A method of wireless communication performed by a user equipment (UE), comprising: receiving downlink control information (DCI) scheduling transmission of a first one or more physical uplink control channel (PUCCH) communications on a first component carrier and a second one or more PUCCH communications on a second component carrier, wherein the DCI includes information identifying a first transmit power configuration for the first one or more PUCCH communications and a second transmit power configuration for the second one or more PUCCH communications; and transmitting the first one or more PUCCH communications in accordance with the first transmit power configuration and the second one or more PUCCH communications in accordance with the second transmit power configuration.

Aspect 2: The method of Aspect 1, wherein the first one or more PUCCH communications comprise a first one or more repetitions of an uplink control information (UCI) message and the second one or more PUCCH communications comprise a second one or more repetitions of the UCI message.

Aspect 3: The method of any of Aspects 1 to 2, wherein the DCI includes a single transmit power control (TPC) command, and wherein the first transmit power configuration and the second transmit power configuration are based at least in part on the single TPC command.

Aspect 4: The method of any of Aspects 1 to 3, wherein the DCI includes a single transmit power control (TPC) command, and wherein one of the first transmit power configuration or the second transmit power configuration is based at least in part on the single TPC command.

Aspect 5: The method of Aspect 4, wherein the first component carrier is associated with a first index and the second component carrier is associated with a second index, and wherein the one of the first transmit power configuration or the second transmit power configuration derived from the single TPC command is based at least in part on at least one of the first index or the second index.

Aspect 6: The method of any of Aspects 4 to 5, wherein the one of the first transmit power configuration or the second transmit power configuration derived from the single TPC command is based at least in part on at least one of a bit indicator of the DCI or a configuration of the DCI.

Aspect 7: The method of any of Aspects 1 to 6, wherein the DCI includes a first transmit power control (TPC) field with a first value and a second TPC field with a second value, and wherein the first transmit power configuration is based at least in part on the first value of the first TPC field and the second transmit power configuration is based at least in part on the second value of the second TPC field.

Aspect 8: The method of any of Aspects 1 to 7, wherein the DCI includes a single transmit power control (TPC) field that maps to a pair of TPC commands, wherein the first transmit power configuration is based at least in part on a first TPC command of the pair of TPC commands and the second transmit power configuration is based at least in part on a second TPC command of the pair of TPC commands.

Aspect 9: The method of Aspect 8, wherein the TPC field is a 3 bit field.

Aspect 10: The method of any of Aspects 8 to 9, wherein a mapping of the TPC field to different TPC commands is a fixed mapping or a radio resource control configured mapping.

Aspect 11: The method of any of Aspects 1 to 10, wherein the first transmit power configuration and the second transmit power configuration are based at least in part on a format of the DCI.

Aspect 12: The method of any of Aspects 1 to 11, wherein a radio resource control configuration indicates a configuration for applying TPC information of the DCI to at least one of the first transmit power configuration or the second transmit power configuration; and wherein the configuration for applying the TPC information indicates at least one of: that the DCI includes a single TPC command applicable to the first transmit power configuration and the second transmit power configuration, that the DCI includes a single TPC command applicable to one of the first transmit power configuration or the second transmit power configuration in accordance with the configuration for applying the TPC information, that the DCI includes a first TPC command applicable to the first transmit power configuration and a second TPC command applicable to the second transmit power configuration, or that the DCI includes a single TPC field that maps to a pair of TPC commands respective corresponding to the first transmit power configuration and the second transmit power configuration.

Aspect 13: The method of Aspect 1, wherein the DCI schedules a downlink shared channel communication and schedules an uplink control channel communication with a plurality of repetitions across a plurality of component carriers for transmitting a feedback message corresponding to the downlink shared channel.

Aspect 14: The method of Aspect 13, wherein the plurality of component carriers includes a first component carrier associated with a first closed loop power adjustment state corresponding to the first transmit power configuration and a second component carrier associated with a second closed loop power adjustment state corresponding to the second transmit power configuration.

Aspect 15: A method of wireless communication performed by a network node, comprising: transmitting downlink control information (DCI) scheduling transmission of a first one or more physical uplink control channel (PUCCH) communications on a first component carrier and a second one or more PUCCH communications on a second component carrier, wherein the DCI includes information identifying a first transmit power configuration for the first one or more PUCCH communications and a second transmit power configuration for the second one or more PUCCH communications; and receiving the first one or more PUCCH communications in accordance with the first transmit power configuration and the second one or more PUCCH communications in accordance with the second transmit power configuration.

Aspect 16: The method of Aspect 15, wherein the first one or more PUCCH communications comprise a first one or more repetitions of an uplink control information (UCI) message and the second one or more PUCCH communications comprise a second one or more repetitions of the UCI message.

Aspect 17: The method of any of Aspects 15 to 16, wherein the DCI includes a single transmit power control (TPC) command, and wherein the first transmit power configuration and the second transmit power configuration are based at least in part on the single TPC command.

Aspect 18: The method of any of Aspects 15 to 17, wherein the DCI includes a single transmit power control (TPC) command, and wherein one of the first transmit power configuration or the second transmit power configuration is based at least in part on the single TPC command.

Aspect 19: The method of Aspect 18, wherein the first component carrier is associated with a first index and the second component carrier is associated with a second index, and wherein the one of the first transmit power configuration or the second transmit power configuration derived from the single TPC command is based at least in part on at least one of the first index or the second index.

Aspect 20: The method of any of Aspects 18 to 19, wherein the one of the first transmit power configuration or the second transmit power configuration derived from the single TPC command is based at least in part on at least one of a bit indicator of the DCI or a configuration of the DCI.

Aspect 21: The method of any of Aspects 15 to 20, wherein the DCI includes a first transmit power control (TPC) field with a first value and a second TPC field with a second value, and wherein the first transmit power configuration is based at least in part on the first value of the first TPC field and the second transmit power configuration is based at least in part on the second value of the second TPC field.

Aspect 22: The method of any of Aspects 15 to 20, wherein the DCI includes a single transmit power control (TPC) field that maps to a pair of TPC commands, wherein the first transmit power configuration is based at least in part on a first TPC command of the pair of TPC commands and the second transmit power configuration is based at least in part on a second TPC command of the pair of TPC commands Aspect 23: The method of Aspect 22, wherein the TPC field is a 3 bit field.

Aspect 24: The method of any of Aspects 22 to 23, wherein a mapping of the TPC field to different TPC commands is a fixed mapping or a radio resource control configured mapping.

Aspect 25: The method of any of Aspects 15 to 24, wherein the first transmit power configuration and the second transmit power configuration are based at least in part on a format of the DCI.

Aspect 26: The method of any of Aspects 15 to 25, wherein a radio resource control configuration indicates a configuration for applying TPC information of the DCI to at least one of the first transmit power configuration or the second transmit power configuration; and wherein the configuration for applying the TPC information indicates at least one of: that the DCI includes a single TPC command applicable to the first transmit power configuration and the second transmit power configuration, that the DCI includes a single TPC command applicable to one of the first transmit power configuration or the second transmit power configuration in accordance with the configuration for applying the TPC information, that the DCI includes a first TPC command applicable to the first transmit power configuration and a second TPC command applicable to the second transmit power configuration, or that the DCI includes a single TPC field that maps to a pair of TPC commands respective corresponding to the first transmit power configuration and the second transmit power configuration.

Aspect 27: The method of any of Aspects 15 to 26, wherein the DCI schedules a downlink shared channel communication and schedules an uplink control channel communication with a plurality of repetitions across a plurality of component carriers for transmitting a feedback message corresponding to the downlink shared channel.

Aspect 28: The method of Aspect 27, wherein the plurality of component carriers includes a first component carrier associated with a first closed loop power adjustment state corresponding to the first transmit power configuration and a second component carrier associated with a second closed loop power adjustment state corresponding to the second transmit power configuration.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

memory; and one or more processors coupled to the memory, the memory comprising instructions executable by the one or more processors to cause the UE to:

receive downlink control information (DCI) scheduling transmission of a first one or more physical uplink control channel (PUCCH) communications, wherein the first one or more PUCCH communications comprise a first subset of a set of PUCCH repetitions, on a first component carrier and a second one or more PUCCH communications, wherein the second one or more PUCCH communications comprise a second subset of the set of PUCCH repetitions, on a second component carrier, wherein the DCI includes information identifying a first transmit power configuration for the first one or more PUCCH communications and a second transmit power configuration for the second one or more PUCCH communications; and transmit the first one or more PUCCH communications in accordance with the first transmit power configuration and the second one or more PUCCH communications in accordance with the second transmit power configuration.

2. The UE of claim 1, wherein the first subset of the set of PUCCH repetitions comprise a first one or more repetitions of an uplink control information (UCI) message and the second subset of the set of PUCCH repetitions comprise a second one or more repetitions of the UCI message.

3. The UE of claim 1, wherein the DCI includes a single transmit power control (TPC) command, and wherein the first transmit power configuration and the second transmit power configuration are based at least in part on the single TPC command.

4. The UE of claim 1, wherein the DCI includes a single transmit power control (TPC) command, and wherein one of the first transmit power configuration or the second transmit power configuration is based at least in part on the single TPC command.

5. The UE of claim 4, wherein the first component carrier is associated with a first index and the second component carrier is associated with a second index, and wherein the one of the first transmit power configuration or the second transmit power configuration derived from the single TPC command is based at least in part on at least one of the first index or the second index.

6. The UE of claim 4, wherein the one of the first transmit power configuration or the second transmit power configuration derived from the single TPC command is based at least in part on at least one of a bit indicator of the DCI or a configuration of the DCI.

7. The UE of claim 1, wherein the DCI includes a first transmit power control (TPC) field with a first value and a second TPC field with a second value, and wherein the first transmit power configuration is based at least in part on the first value of the first TPC field and the second transmit power configuration is based at least in part on the second value of the second TPC field.

8. The UE of claim 1, wherein the DCI includes a single transmit power control (TPC) field that maps to a pair of TPC commands, wherein the first transmit power configuration is based at least in part on a first TPC command of the pair of TPC commands and the second transmit power configuration is based at least in part on a second TPC command of the pair of TPC commands.

9. The UE of claim 8, wherein the TPC field is a 3 bit field.

10. The UE of claim 8, wherein a mapping of the TPC field to different TPC commands is a fixed mapping or a radio resource control configured mapping.

11. The UE of claim 1, wherein the first transmit power configuration and the second transmit power configuration are based at least in part on a format of the DCI.

12. The UE of claim 1, wherein a radio resource control configuration indicates a configuration for applying at least one of the first transmit power configuration or the second transmit power configuration; and wherein the configuration indicates at least one of:

that the DCI includes a single transmit power control (TPC) command applicable to the first transmit power configuration and the second transmit power configuration, that the DCI includes a single TPC command applicable to one of the first transmit power configuration or the second transmit power configuration in accordance with the configuration, that the DCI includes a first TPC command applicable to the first transmit power configuration and a second TPC command applicable to the second transmit power configuration, or that the DCI includes a single TPC field that maps to a pair of TPC commands respective corresponding to the first transmit power configuration and the second transmit power configuration.

13. The UE of claim 1, wherein the DCI schedules a downlink shared channel communication and schedules an uplink control channel communication with a plurality of repetitions across a plurality of component carriers for transmitting a feedback message corresponding to the downlink shared channel.

14. The UE of claim 13, wherein the plurality of component carriers includes a first component carrier associated with a first closed loop power adjustment state corresponding to the first transmit power configuration and a second component carrier associated with a second closed loop power adjustment state corresponding to the second transmit power configuration.

15. A network node for wireless communication, comprising:

memory; and one or more processors coupled to the memory, the memory comprising instructions executable by the one or more processors to cause the network node to:

transmit downlink control information (DCI) scheduling transmission of a first one or more physical uplink control channel (PUCCH) communications, wherein the first one or more PUCCH communications comprise a first subset of a set of PUCCH repetitions, on a first component carrier and a second one or more PUCCH communications, wherein the second one or more PUCCH communications comprise a second subset of the set of PUCCH repetitions, on a second component carrier, wherein the DCI includes information identifying a first transmit power configuration for the first one or more PUCCH communications and a second transmit power configuration for the second one or more PUCCH communications; and receive the first one or more PUCCH communications in accordance with the first transmit power configuration and the second one or more PUCCH communications in accordance with the second transmit power configuration.

16. The network node of claim 15,
wherein the first subset of the set of PUCCH repetitions comprise a first one or more repetitions of an uplink control information (UCI) message and the second subset of the set of PUCCH repetitions comprise a second one or more repetitions of the UCI message.

17. The network node of claim 15,
wherein the DCI includes a single transmit power control (TPC) command, and
wherein the first transmit power configuration and the second transmit power configuration are based at least in part on the single TPC command.

18. The network node of claim 15,
wherein the DCI includes a single transmit power control (TPC) command, and
wherein one of the first transmit power configuration or the second transmit power configuration is based at least in part on the single TPC command.

19. The network node of claim 18,
wherein the first component carrier is associated with a first index and the second component carrier is associated with a second index, and
wherein the one of the first transmit power configuration or the second transmit power configuration derived from the single TPC command is based at least in part on at least one of the first index or the second index.

20. The network node of claim 18,
wherein the one of the first transmit power configuration or the second transmit power configuration derived from the single TPC command is based at least in part on at least one of a bit indicator of the DCI or a configuration of the DCI.

21. The network node of claim 15,
wherein the DCI includes a first transmit power control (TPC) field with a first value and a second TPC field with a second value, and
wherein the first transmit power configuration is based at least in part on the first value of the first TPC field and the second transmit power configuration is based at least in part on the second value of the second TPC field.

22. The network node of claim 15,
wherein the DCI includes a single transmit power control (TPC) field that maps to a pair of TPC commands,
wherein the first transmit power configuration is based at least in part on a first TPC command of the pair of TPC commands and the second transmit power configuration is based at least in part on a second TPC command of the pair of TPC commands.

23. The network node of claim 22,
wherein the TPC field is a 3 bit field.

24. The network node of claim 22,
wherein a mapping of the TPC field to different TPC commands is a fixed mapping or a radio resource control configured mapping.

25. The network node of claim 22,
wherein the first transmit power configuration and the second transmit power configuration are based at least in part on a format of the DCI.

26. The network node of claim 15,
wherein a radio resource control configuration indicates a configuration for applying at least one of the first transmit power configuration or the second transmit power configuration; and wherein the configuration indicates at least one of:
that the DCI includes a single transmit power control (TPC) command applicable to the first transmit power configuration and the second transmit power configuration,
that the DCI includes a single TPC command applicable to one of the first transmit power configuration or the second transmit power configuration in accordance with the configuration,
that the DCI includes a first TPC command applicable to the first transmit power configuration and a second TPC command applicable to the second transmit power configuration, or
that the DCI includes a single TPC field that maps to a pair of TPC commands respective corresponding to the first transmit power configuration and the second transmit power configuration.

27. The network node of claim 15,
wherein the DCI schedules a downlink shared channel communication and schedules an uplink control channel communication with a plurality of repetitions across a plurality of component carriers for transmitting a feedback message corresponding to the downlink shared channel.

28. The network node of claim 27,
wherein the plurality of component carriers includes a first component carrier associated with a first closed loop power adjustment state corresponding to the first transmit power configuration and a second component carrier associated with a second closed loop power adjustment state corresponding to the second transmit power configuration.

29. A method of wireless communication performed by a user equipment (UE), comprising:
receiving downlink control information (DCI) scheduling transmission of a first one or more physical uplink control channel (PUCCH) communications, wherein the first one or more PUCCH communications comprise a first subset of a set of PUCCH repetitions, on a first component carrier and a second one or more PUCCH communications, wherein the second one or more PUCCH communications comprise a second subset of the set of PUCCH repetitions, on a second component carrier, wherein the DCI includes information identifying a first transmit power configuration for the first one or more PUCCH communications and a second transmit power configuration for the second one or more PUCCH communications; and
transmitting the first one or more PUCCH communications in accordance with the first transmit power configuration and the second one or more PUCCH communications in accordance with the second transmit power configuration.

30. A method of wireless communication performed by a network node, comprising:
transmitting downlink control information (DCI) scheduling transmission of a first one or more physical uplink control channel (PUCCH) communications, wherein the first one or more PUCCH communications comprise a first subset of a set of PUCCH repetitions, on a first component carrier and a second one or more PUCCH communications, wherein the second one or more PUCCH communications comprise a second subset of the set of PUCCH repetitions, on a second component carrier, wherein the DCI includes information identifying a first transmit power configuration for the first one or more PUCCH communications and a second transmit power configuration for the second one or more PUCCH communications; and receiving the first one or more PUCCH communications in accordance with the first transmit power configuration and the second one or more PUCCH communications in accordance with the second transmit power configuration.

\* \* \* \* \*